US011146336B2

(12) United States Patent
Blaschke et al.

(10) Patent No.: US 11,146,336 B2
(45) Date of Patent: Oct. 12, 2021

(54) MEDIA CONVERTER AND METHOD FOR OPERATING A MEDIA CONVERTER

(71) Applicant: Eaton Intelligent Power Limited, Dublin (IE)

(72) Inventors: Erik Blaschke, Dallgow-Doeberitz (DE); Matthias Hansing, Bad Honnef (DE); Franz Heller, Sankt Augustin (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/270,055

(22) PCT Filed: Aug. 19, 2019

(86) PCT No.: PCT/EP2019/072102

§ 371 (c)(1),
(2) Date: Feb. 22, 2021

(87) PCT Pub. No.: WO2020/038867

PCT Pub. Date: Feb. 27, 2020

(65) Prior Publication Data

US 2021/0226705 A1 Jul. 22, 2021

(30) Foreign Application Priority Data

Aug. 23, 2018 (DE) ..................... 10 2018 120 541.4

(51) Int. Cl.
*H04B 10/278* (2013.01)
*H04B 10/80* (2013.01)
(Continued)

(52) U.S. Cl.
CPC ......... *H04B 10/278* (2013.01); *H04B 10/564* (2013.01); *H04B 10/69* (2013.01);
(Continued)

(58) Field of Classification Search
CPC .. H04B 10/278; H04B 10/564; H04B 10/803; H04B 10/69; H04B 10/506; H04B 10/505; H04B 10/25759
(Continued)

(56) References Cited

U.S. PATENT DOCUMENTS 6,619,867 B1 * 9/2003 Asahi .................. H04B 10/506 398/102
6,980,831 B2 * 12/2005 Matsuyoshi ..... H04B 10/25758 455/561

(Continued)

FOREIGN PATENT DOCUMENTS

DE 102010006711 A1 8/2011
EP 1261159 A1 11/2002
WO WO 2007021728 A1 2/2007

*Primary Examiner* — Abbas H Alagheband
(74) *Attorney, Agent, or Firm* — Leydig, Voit & Mayer, Ltd.

(57) ABSTRACT

A media converter has an electrical bus port for connecting a first electrical bus; and an optical bus port for connecting an optical bus. The media converter is configured to convert an electrical signal of the first electrical bus into an optical signal of the optical bus in such a way that, at a first value of an internal control signal of the media converter, the optical signal corresponds to the electrical signal and, at a second value of the internal control signal, the optical signal has an inverted shape corresponding to the electrical signal. In a transmission phase during which the internal control signal changes from the first value to the second value, the media converter is configured to emit the optical signal in such a way that the optical signal corresponds to the electrical signal until the end of the transmission phase.

13 Claims, 3 Drawing Sheets

(51) Int. Cl.

| | |
|---|---|
| ***H04B 10/69*** | (2013.01) |
| ***H04B 10/564*** | (2013.01) |
| *H04B 10/50* | (2013.01) |
| *H04B 10/2575* | (2013.01) |

(52) U.S. Cl.
CPC ..... *H04B 10/803* (2013.01); *H04B 10/25759* (2013.01); *H04B 10/505* (2013.01); *H04B 10/506* (2013.01)

(58) Field of Classification Search
USPC .............................................................. 398/60
See application file for complete search history.

(56) References Cited

U.S. PATENT DOCUMENTS

| | | | | |
|---|---|---|---|---|
| 7,072,592 | B2 * | 7/2006 | Sarraf | H04B 10/506 398/192 |
| 7,171,116 | B2 * | 1/2007 | Korotky | H04B 10/505 398/16 |
| 9,057,846 | B2 * | 6/2015 | Xi | H04B 10/278 |
| 9,787,395 | B2 * | 10/2017 | Chung | H04B 10/25759 |
| 2004/0052518 | A1 * | 3/2004 | Korotky | H04B 10/5053 398/2 |
| 2007/0058666 | A1 | 3/2007 | Pratt | |
| 2007/0086789 | A1 * | 4/2007 | Sekiya | H04B 10/505 398/199 |
| 2012/0027415 | A1 * | 2/2012 | Chan | H04B 10/504 398/115 |

* cited by examiner

MEDIA CONVERTER AND METHOD FOR OPERATING A MEDIA CONVERTER

CROSS-REFERENCE TO PRIOR APPLICATIONS

This application is a U.S. National Phase Application under 35 U.S.C. § 371 of International Application No. PCT/EP2019/072102, filed on Aug. 19, 2019, and claims benefit to German Patent Application No. DE 10 2018 120 541.4, filed on Aug. 23, 2018. The International Application was published in German on Feb. 27, 2020 as WO 2020/038867 A1 under PCT Article 21(2).

FIELD

The present disclosure relates to a media converter, a bus arrangement with the media converter and a method for operating a media converter.

BACKGROUND

The media converter or the bus arrangement can be employed in the field of automation technology. They can be used in industrial bus communication. A bus arrangement can, for example, have a first electrical bus, an optical bus, and a second electrical bus. A media converter is thus arranged between the first electrical bus and the optical bus and a further media converter is arranged between the optical bus and the second electrical bus. A media converter converts an electrical signal into an optical signal and vice versa.

The bus arrangement typically also includes a coordinator, which is connected to the first electrical bus, and a plurality of stations, which are connected, for example, to the first or the second electrical bus. The stations can be implemented as actuators or sensors. The actuators can be switching devices such as contactors, motor starters and circuit breakers, command devices and frequency converters.

Document US 2007/0086789 A1 describes a chirp signal circuit and an optical transmission system. A driver generates from a modulation signal and a chirp signal a signal which is supplied to a phase modulator of an optical wave guide. The driver comprises a logic inverter which provides the modulation signal as an output signal without inversion if the chirp signal has a logic value of 0, and the modulation signal is provided as an output signal with logic inversion if the chirp signal has a logic value of 1.

Document EP 1261159 A1 relates to wavelength multiplexing in optical systems. Signals carrying information are supplied via electrical-optical converter to a multiplexer and additionally via inverter and electrical-optical converter to the multiplexer.

Document DE 102010006711 A1 specifies a system for optical data transfer. A media converter is connected to an interface for an electrical data bus. An inverter, which converts an electrical data stream into an optical data stream or an optical data stream into an electrical data stream, is arranged in the media converter. The media converter has a means for injecting or coupling out a diagnostic and control data flow that can be supplied to the inverter via an interface such that the values of physical state variables can be detected by a component of the inverter, and the associated information in the diagnostic and control data stream can be conveyed to the data stream in the media converter.

Document WO 2007/021728 A1 describes a connection unit having a first and second interface in order to physically connect a first communication medium and second communication medium. The connection unit provides a communications link for the first and the second communication media and processes management data, which have been communicated via the first communication medium and/or second communication medium.

SUMMARY

An embodiment of the present invention provides a media converter that has an electrical bus port for connecting a first electrical bus; and an optical bus port for connecting an optical bus. The media converter is configured to convert an electrical signal of the first electrical bus into an optical signal of the optical bus in such a way that, at a first value of an internal control signal of the media converter, the optical signal corresponds to the electrical signal and, at a second value of the internal control signal, the optical signal has an inverted shape corresponding to the electrical signal. In a transmission phase during which the internal control signal changes from the first value to the second value, the media converter is configured to emit the optical signal in such a way that the optical signal corresponds to the electrical signal until the end of the transmission phase.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
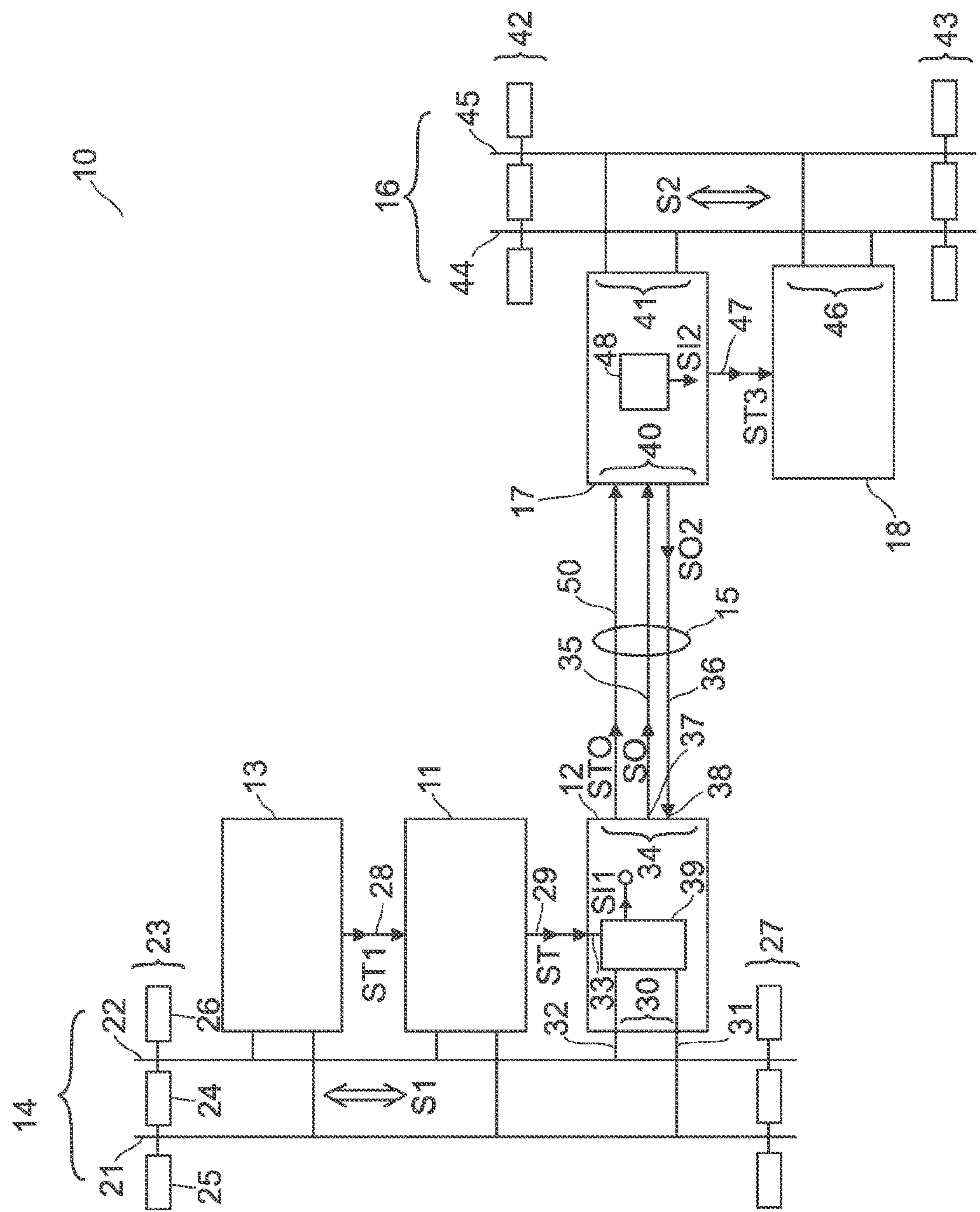
FIG. 1 and FIG. 2 show examples of a bus arrangement.

Embodiments of the present invention provide a media converter and a method for operating a media converter that can receive and forward a control signal.

In one embodiment, a media converter comprises an electrical bus port for connecting a first electrical bus and an optical bus port for connecting an optical bus. The media converter is designed to convert an electrical signal of the first electrical bus into an optical signal of the optical bus in such a way that at a first value of an internal control signal of the media converter the optical signal corresponds to the electrical signal, and at a second value of the internal control signal the optical signal has an inverted form corresponding to the electrical signal.

The media converter can advantageously generate a single optical signal both from a received electrical signal and from an internal control signal. Thus, a single optical connection, such as a single fiber optic cable, is sufficient to transfer both the electrical signal and the internal control signal. The media converter can be called a repeater, for example. Enumeration information can advantageously be transmitted via an optical fiber. The enumeration information can be used for initial addressing of the stations on the bus.

In one embodiment, the media converter is designed to emit the optical signal in a transmission phase during which the internal control signal changes from the first value to the second value such that the optical signal corresponds to the electrical signal until the end of the transmission phase. If the optical signal corresponds to the electrical signal, the optical signal is not inverted with respect to the electrical signal. The optical signal is advantageously either inverted during the entire duration of the transmission phase or transferred non-inverted during the entire duration of the transmission phase.

In one embodiment, the media converter is designed to change a value of the optical signal in a rest phase after a change in the internal control signal from the first value to the second value and to invert the optical signal with respect to the electrical signal in a further transmission phase following the rest phase.

The media converter emits the optical signal with a delay compared to the electrical signal, for example due to the internal processing time of the media converter. The delay can be, for example, the length of a pulse or half a clock phase or an integral multiple thereof.

A transmission phase includes a data transfer phase. The transmission phase can also include a synchronization phase, which is followed by the data transfer phase. There is a rest phase between two transmission phases.

In one embodiment, the electrical bus port of the media converter has two electrical lines that are connected to two electrical bus lines of the first electrical bus. The number of electrical bus lines of the first electrical bus can be exactly two.

In one embodiment, a bus arrangement comprises the media converter, the optical bus and a further media converter. The further media converter comprises an electrical bus port for connecting a second electrical bus and an optical bus port for connecting the optical bus. The further media converter converts the optical signal of the optical bus into a further electrical signal of the second electrical bus.

In one embodiment, the media converter, the further media converter and the optical bus are designed for bidirectional optical data transmission.

In one embodiment, the optical bus port of the media converter has an optical terminal, which is connected to a first optical line of the optical bus. The number of optical lines of the optical bus can be exactly one, for example. The first optical line can, for example, be used bidirectionally, i.e. allow an optical signal to be transferred in both directions.

In one embodiment, the optical bus port of the media converter has two optical connections, which are connected to a first and a second optical line of the optical bus. The number of optical lines of the optical bus can be exactly two. The first optical line of the optical bus conducts the optical signal from the media converter to the further media converter. The second optical line of the optical bus conducts an optical signal to the media converter from the further media converter. The optical bus thus achieves bidirectional transmission, that is, transmission of optical signals in both directions.

The number of optical lines of the optical bus can be less than three. The bus arrangement can be free of an electrical line that connects the media converter to the further media converter.

In one embodiment, the further media converter generates the further electrical signal and a control input signal from the optical signal.

In one embodiment, the further media converter detects whether it is receiving the optical signal in inverted form. It changes the value of the control input signal from a first value to a second value in the event that the further media converter has detected that it is receiving the optical signal in inverted form. If the further media converter detects that it is receiving the optical signal in non-inverted form, the further media converter generates the control input signal having the first value.

The media converter comprises a first electrical control terminal, which can also be referred to as a control input or a control signal input, for example.

The media converter can be implemented as a passive media converter or as an active media converter.

In one embodiment, the media converter can be set as a passive media converter or as an active media converter. The setting of the media converter can be done by evaluating a switch position of a switch of the media converter or by receiving a command from a coordinator via the electrical signal. The switch can be implemented as hardware.

In one embodiment, the media converter (for example as a passive media converter) is configured to tap a control signal at the first electrical control terminal and to generate the internal control signal from the control signal. Alternatively, the media converter (e.g. as an active media converter) is configured to generate the internal control signal on the basis of the electrical signal of the first electrical bus, i.e. to generate the internal control signal based on a command transmitted with the electrical signal. The configuration can be adjustable, as explained in more detail above.

The further media converter can be implemented as a passive media converter or as an active media converter.

In one embodiment, the further media converter can be set as a passive media converter or as an active media converter. The setting of the further media converter can take place by evaluating a switch position of a switch of the further media converter or by receiving a command from the coordinator via the optical signal.

In one embodiment, for example, an active media converter can be assigned an address by the coordinator. A passive media converter can, for example, be free of any address assigned by the coordinator. A passive media converter is "invisible" and does not use any address in the address space; an active media converter is "visible."

In one embodiment, the control input signal is an internal signal in the further media converter. The control input signal can be used, for example, to activate the further media converter. If the further media converter is activated, it can, for example, take its address from the data sent by a coordinator of the bus arrangement. In this case, the further media converter is implemented or set as an active media converter. Since at most only one station or media converter is activated at any given instant, this station or media converter takes over this address. This allows an address to be assigned to the station or media converter.

Alternatively, the further media converter emits the control input signal as an external signal, for example to a station on the second bus, also referred to as a further station. The control input signal can, for example, be a further control signal, which the further media converter emits to the further station, so that the further station is activated and takes over an address from the further electrical signal. In this case, the further media converter can be implemented or set as a passive media converter.

In one embodiment, the further media converter detects whether it is receiving the optical signal in inverted form and emits the further electrical signal to the second electrical bus in such a way that the further electrical signal is inverted with respect to the optical signal in the event that the further media converter has detected that it is receiving the optical signal in inverted form. If the further media converter detects that it is receiving the optical signal in non-inverted form, it does not invert the further electrical signal with respect to the optical signal. The further electrical signal can have the same form as the electrical signal regardless of the value of the internal control signal. In particular, the further electrical signal is not inverted with respect to the electrical signal. The further media converter emits the further electrical signal after a delay with respect to the optical signal, for example due to an internal processing time of the further media converter.

In one embodiment, the bus arrangement comprises a coordinator, which is coupled to the electrical bus port of the media converter via the first electrical bus. The coordinator is designed, for example, to set the value of the control signal. The coordinator comprises an electrical control terminal, which can also be referred to as a control output or a control signal output. The electrical control terminal of the coordinator can, for example, be connected directly to the first electrical control terminal of the media converter via a control line. This can be the case, for example, if there is no station between the coordinator and the media converter on the first electrical bus. The coordinator can, for example, transmit the control signal to the media converter via the control line.

In one embodiment, the coordinator can use the electrical signal to give the media converter the command to generate the internal control signal, that is to, say, set the internal control signal from the first to the second value (for example, in the case of an active media converter).

In one embodiment, the bus arrangement comprises a first station, which is coupled to the coordinator via the first electrical bus, and comprises a second electrical control terminal, which is connected directly to the first electrical control terminal of the media converter via a control line. The coordinator can, for example, use the electrical signal to give the first station a command for the station to transmit the control signal to the media converter via the control line. The first station also includes a first electrical control terminal, which can also be implemented as a control input or control signal input. The second electrical control terminal can be implemented as a control output or a control signal output.

If the control signal is sent to the media converter, the media converter (which can be implemented as an active media converter) is activated and then takes over its address from the electrical signal, or the media converter (which can be implemented as a passive media converter, for example) generates the internal control signal, i.e. sets the internal control signal from roughly the first value to the second value.

At least one additional station can be arranged on the first electrical bus between the coordinator and the station. The control terminal of the coordinator is coupled to the first control terminal of the at least one additional station via a control line. The second control terminal of the at least one additional station is coupled to the first control terminal of the first station via a control line. The second control terminal of the first station is connected directly to the first control terminal of the media converter via the control line. The coordinator, the at least one additional station, the first station and the media converter are thus linked as a daisy chain.

In one embodiment, the bus arrangement comprises at least one further station, which is connected to the further media converter via the second electrical bus.

The bus arrangement can be implemented in various embodiments, depending on whether, for example, the media converter and the further media converter are implemented or set as active or passive media converters.

In one embodiment, the media converter receives the control signal with the second value at its first electrical control terminal and inverts the optical signal with respect to the electrical signal. The control signal is emitted from the first station or, if this is not available, from the coordinator via the control line to the first electrical control terminal of the media converter. The further media converter detects that it is receiving the optical signal in inverted form and changes the value of the control input signal from the first value to the second value. The further media converter transmits the control input signal as a further control signal to an electrical control terminal of the further station connected to the second electrical bus. The further station is activated by the further control signal and takes over its address from the further electrical signal. The media converter and the further media converter are implemented or set as passive. They do not have their own addresses. They are used to transmit the control signal received at the first electrical control terminal of the media converter to the further station connected to the second electrical bus.

In an alternative embodiment, the media converter receives a signal at its first electrical control terminal, for example with the second value, is thereby activated and takes its address from the electrical signal. The coordinator then uses the electrical signal to transmit the command to the media converter to generate the internal control signal so that the media converter inverts the optical signal with respect to the electrical signal. The further media converter detects that it is receiving the optical signal in inverted form and changes the value of the control input signal from the first value to the second value. The further media converter is activated by the control input signal and takes its address from the optical signal.

The coordinator then uses the electrical and optical signals to transmit the command to the further media converter to generate the further control signal and to emit it to the first electrical control terminal of the further station connected to the second electrical bus. The further station is activated by the further control signal and takes over its address from the further electrical signal. The media converter and the further media converter are implemented or set as active. They have their own addresses. The media converter, the further media converter and the further station are activated in different successive transmission phases.

In alternative embodiments, the media converter is implemented or set as active and the further media converter is implemented or set as passive, or the media converter is implemented or set as active and the further media converter is implemented or set as active. Variants of the methods described above can be carried out accordingly.

In one embodiment, a method for operating a media converter comprises the following steps: the media converter generating an internal control signal, the media converter receiving an electrical signal from a first electrical bus, and the media converter emitting an optical signal to an optical bus. The media converter emits the optical signal in such a way that at a first value of the internal control signal the optical signal corresponds to the electrical signal, and at a second value of the internal control signal the optical signal is inverted with respect to the electrical signal.

The control signal can be received by the media converter, for example at a first electrical control terminal of the media converter, for example in a transmission phase, and the internal control signal can be set on the basis of the control signal. Alternatively, the internal control signal can be set by the media converter, for example by means of a command in the electrical signal, for example in the transmission phase. The transmission phase is followed by a further transmission phase in which the optical signal is inverted with respect to the electrical signal at a second value of the internal control signal.

The optical signal emitted by the media converter advantageously reproduces both the information contained in the electrical signal and the information contained in the internal control signal. Thus, a single optical connection, such as a single fiber optic cable, is sufficient.

The method for operating a media converter can be implemented, for example, with the media converter and/or the bus arrangement according to one of the embodiments described above.

The invention is explained in more detail below using a plurality of embodiments with reference to the figures. Components or functional units that have the same function or effect have the same reference signs. To the extent that components or functional units correspond in their function, their description is not repeated in the description of each of the figures.

FIG. 1 shows an example for a bus arrangement 10. The bus arrangement 10 comprises a first station 11, a media converter 12 and a coordinator 13. The media converter 12 can be implemented as a repeater, for example. The first station 11 can be implemented as a node. The bus arrangement 10 further comprises a first electrical bus 14 to which the coordinator 13, the first station 11 and the media converter 12 are connected. The first electrical bus 14 can also be referred to as a K-bus. In addition, the bus arrangement 10 comprises an optical bus 15 which is connected to the media converter 12. The optical bus 15 can also be referred to as an N-bus. Since the two buses 14 and 15 can be referred to as K-bus and N-bus, the media converter 12 can also be referred to as a repeater K-N.

The bus arrangement 10 also includes a further media converter 17, which is connected to the optical bus 15. The second electrical bus 16 can be referred to as an L-bus. The further media converter 17 can be implemented, for example, as a repeater, in particular as a repeater N-L (since it couples the N-bus to the L-bus). A second electrical bus 16 of the bus arrangement 10 is connected to the further media converter 17. The combination of the media converter 12 and the further media converter 17 can also be referred to as a repeater K-L. In this way, an electrical isolation is achieved between the buses K and L, in this case between the first electrical bus 14 and the second electrical bus 16. The bus arrangement 10 comprises a further station 18, which is connected to the second electrical bus 16. The coordinator 13 is thus coupled to the first station 11 and the media converter 12 via the first electrical bus 14, to the further media converter 17 via the first electrical bus 14 and the optical bus 15, and finally via the first electrical bus 14, the optical bus 15 and the second electrical bus 16 to the further station 18.

The first electrical bus 14 has a first and a second electrical bus line 21, 22. In addition, the first electrical bus 14 can have a terminating arrangement 23 at one end of the first electrical bus 14. The terminating arrangement 23 can, for example, have a first to third resistor 24 to 26. A first resistor 24 connects the first electrical bus line 21 to the second electrical bus line 22. A second resistor 25 connects the first electrical bus line 21 to a reference potential connection or a supply voltage connection. Correspondingly, a third resistor 26 connects the second electrical bus line 22 to the reference potential connection or the supply voltage connection.

The first electrical bus 14 can have a further terminating arrangement 27, which is implemented like the terminating arrangement 23. The first and the second electrical bus 14, 16 have a fixed idle state. The optical bus 15 has a variable idle state, since the optical signal SO must be able to be transferred both inverted and non-inverted. The first and the second electrical bus 14, 16 can be operated, for example, according to the interface standard TIA/EIA-485 A, also called EIA-485 or RS-485.

The coordinator 13 is connected to the first station 11 via a first control line 28. The first station 11 is also connected to the media converter 12 via a control line 29.

The media converter 12 comprises an electrical bus port 30, which is connected to the first electrical bus 14. For this purpose, the first bus port 30 has a first and a second connection line 31, 32, pin or terminal, which are connected to the first and the second electrical bus line 21, 22. The media converter 12 further comprises a first electrical control terminal 33, which is connected to the control line 29. In addition, the media converter 12 comprises an optical bus port 37 which is connected to the optical bus 15. The media converter 12 further comprises a control unit 39. The control unit 39 is connected on the input side to the first electrical control terminal 33. The control unit 39 is connected to the electrical bus port 30, for example bidirectionally. Furthermore, the control unit 39 is coupled to the optical bus port 34, for example bidirectionally.

The optical bus 15 comprises a first and a second optical line 35, 36. The optical bus port 34 has a first and a second optical terminal 37, 38 which are connected to the first and second optical lines 35, 36. The first and second optical lines 35, 36 can be implemented, for example, as optical fibers or glass fibers, such as a monomode fiber or a multimode fiber. The first and second optical lines 35, 36 couple the optical bus port 34 of the media converter 12 to an optical bus port 40 of the further media converter 17. The first and the second optical terminal 37, 38 can be produced as an optical connector.

The further media converter 17 has an electrical bus port 41, which is connected to the second electrical bus 16. The second electrical bus 16 can be implemented like the first electrical bus 14. The second electrical bus 16 can, for example, have a terminating arrangement 42 at one end, which is implemented like the terminating arrangement 23. Accordingly, the second electrical bus 16 can have a further terminating arrangement 43 at a further end, which is implemented like the terminating arrangement 23.

The second electrical bus 16 comprises a third and a fourth electrical bus line 44, 45. The electrical bus port 41 of the further media converter 17 comprises two lines, pins or terminals which are connected to the third and fourth electrical bus lines 44, 45. The further station 18 also includes an electrical bus port 46, which is connected to the second electrical bus 16. A further control line 47 connects the further media converter 17 to the further station 18. The further station 18 can also be implemented, for example, as a node.

The optical bus 15 comprises an optical control line 50, which couples the media converter 12 to the further media converter 17. The optical bus port 34 of the media converter 12 is thus coupled to the optical bus port 40 of the further media converter 17 via the optical control line 50. The media converter 12 can thus be connected on the output side to the further media converter 17 via the optical control line 50.

An electrical signal S1 is present on the first electrical bus 14. The electrical signal S1 is fed to the electrical bus port 30 of the media converter 12. The electrical signal S1 is emitted by the coordinator 13 or by the first station 11, for example. A control signal ST is applied to the first electrical control terminal 33 of the media converter 12. The first station 11 emits the control signal ST to the first electrical control terminal 33 of the media converter 12. The control signal ST is implemented as an electrical signal. The coordinator 13 also emits a first control signal ST1 to the first station 11.

The media converter 12 generates an optical signal SO on the basis of the electrical signal S1 and emits the optical signal SO via the optical bus 15 to the further media converter 17. The optical signal SO is emitted from the media converter 12 to the further media converter 17 via, for example, the first optical line 35. A further optical signal SO2 can be emitted from the further media converter 17 to the media converter 12 via the second optical line 36. The first optical line 35 can be implemented as a forward line and the second optical line 36 as a return line, for example. In addition, the media converter 12 emits an optical control signal STO to the further media converter 17 via the optical control line 50. The media converter 12 generates an internal control signal SI1.

The further media converter 17 generates a further electrical signal S2 depending on the optical signal SO and emits the further electrical signal S2 to the second electrical bus 16. The second electrical bus 16 forwards the further electrical signal S2 to the further station 18. The further media converter 17 generates a control input signal SI2 from the optical control signal STO. The further media converter 17 emits a further control signal ST3 to the further station 18.

The coordinator can thus activate the first station 11 by means of the first control signal ST1 via the first control line 28, for example in a preceding transmission phase.

The first station 11 can activate the media converter 12 by means of the control signal ST via the control line 29, for example in a transmission phase that follows the preceding transmission phase. For this purpose, for example in the transmission phase, the coordinator 13 issues a command via the electrical signal S1 to the first station 11 for the first station 11 to generate the control signal ST, for example in the form of a transition from a first value W1 to a second value W2 or a pulse or a plurality of pulses.

The media converter 12 can activate the further media converter 17 by means of the optical control signal STO via the optical control line 50, for example in a further transmission phase that follows the transmission phase. For this purpose, for example in the further transmission phase, the coordinator 13 issues a command via the electrical signal S1 to the media converter 12 for the media converter 12 to generate the internal control signal SI1 and then generate the optical control signal STO. The control unit 39 changes the internal control signal SI1 from a first value W1 to a second value W2. The optical control signal STO can correspond to the internal control signal SI1. The control unit 39 can have a memory location for storing the internal control signal SI1.

Finally, the further media converter 17 can activate the further station 18 by emitting the further control signal ST3 via the further control line 47, for example in a subsequent transmission phase. For this purpose, for example, in the subsequent transmission phase, the coordinator 13 issues a command via the electrical signal S1 and the optical signal SO to the further media converter 17, so that the further media converter 17 generates the further control signal ST3.

For the method described above, the media converter 12 and the further media converter 17 are implemented or set as active media converters.

Alternatively, the first station 11 can activate the further station 18 by the control signal ST via the control line 29, the media converter 12, the optical bus 15, the further media converter 17 and the further control line 47. The media converter 12 and the further media converter 17 are implemented or set as passive media converters.

At the same time, at most one module from the set of stations 11, 18 and media converters 12, 17 is activated. An activated station 11, 18 or media converter 12, 17 takes its address from the applied electrical signal S1, S2 or optical signal SO. This ensures that an address value is only assigned to one module.

Advantageously, the coordinator 13 can also operate remote users such as the further station 18 via the optical bus 15. The optical bus 15 allows transmission and data without interference from electromagnetic waves. The optical bus 15 can advantageously also be installed in rooms and facilities in which electrical lines cannot be laid for safety reasons. The optical bus 15 advantageously allows energy-saving data transmission over greater distances. An electrical isolation between the first electrical bus 14 and the second electrical bus 16 is advantageously achieved.

The bus arrangement 10, also known as the bus system, is designed to enumerate stations 11, 18 of the bus by means of a separate control line 28, 29, 47 in order to determine the position of the stations 11, 18 on the bus. If there is a transition to an optical medium, a further signal line or control line is required for this. The further control line is implemented as an optical control line 50, for example.

In a further embodiment (not shown), a further media converter (for example, a further repeater) is connected to the second electrical bus 16. In this way, it is also possible to cascade electrically isolated bus segments.

Figure 2:
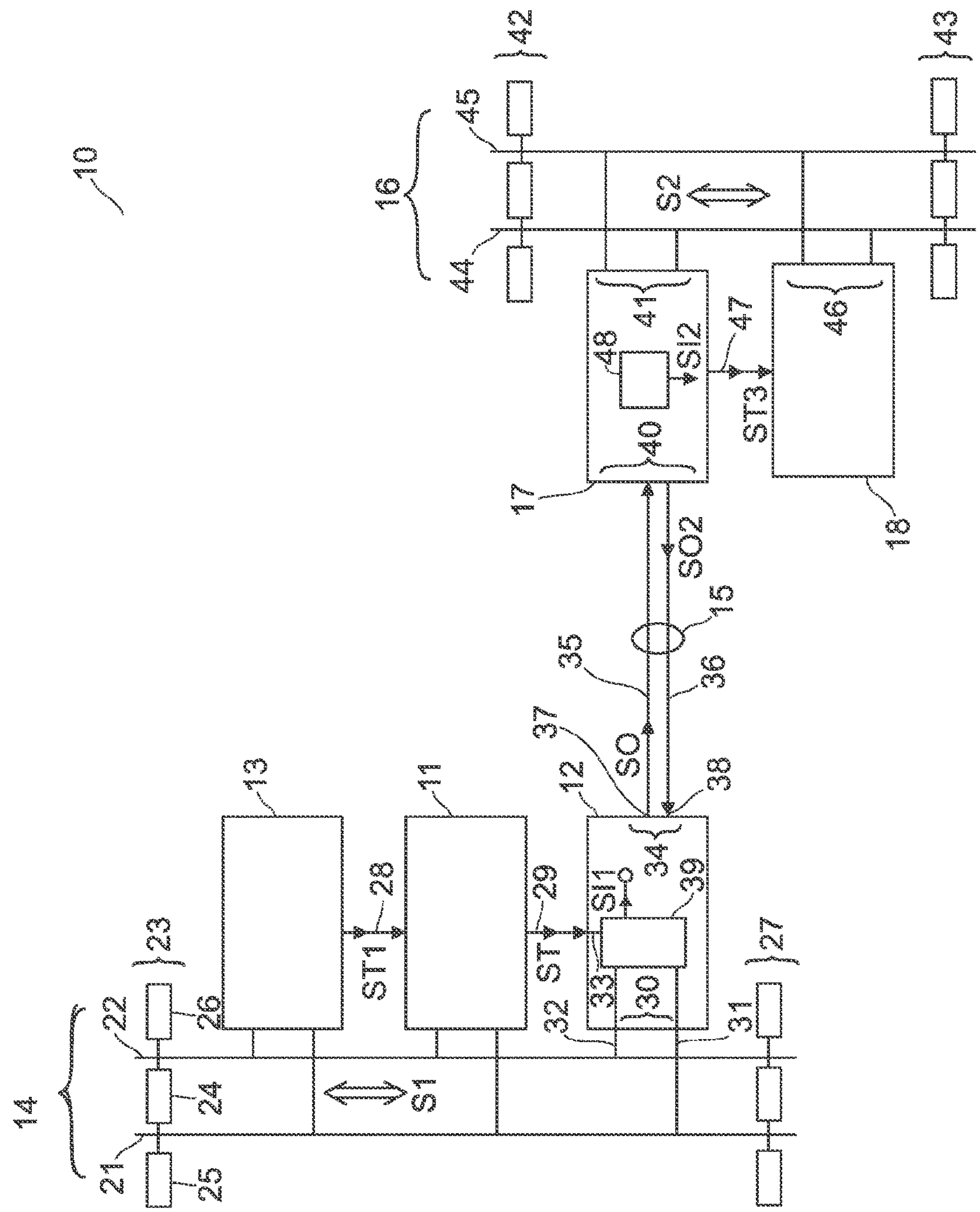

FIG. 2 shows a further example of a bus arrangement 10 that is a further development of the bus arrangement shown in FIG. 1. In FIG. 2, the optical control line 50 is omitted. The optical bus 15 thus comprises only the first and second optical lines 35, 36. The number of optical lines 35, 36 of the optical bus 15 is exactly two. The optical signal SO is based on the electrical signal S1 and the internal control signal SI1, as explained in more detail in FIG. 3. The further media converter 17 generates the control input signal S12 and the further electrical signal S2 from the optical signal SO. For this purpose, the further media converter 17 comprises a control unit 48, such as a logic circuit, a microprocessor or a microcontroller.

The optical bus 15 advantageously comprises only two optical transmission lines 35, 36 and can be implemented with less effort. The optical control line 50 is advantageously omitted.

Figure 3:
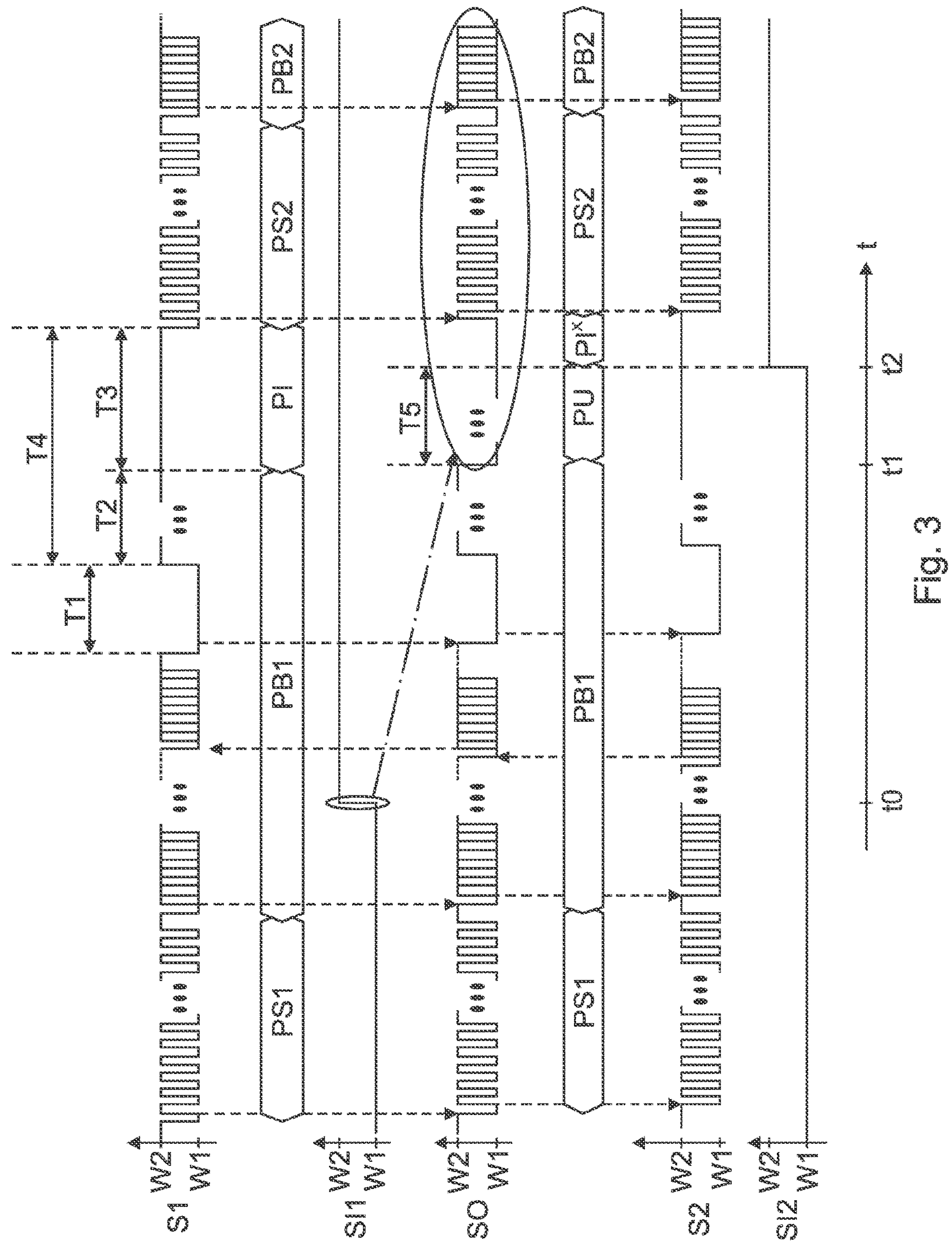
FIG. 3 shows an example for signals of a bus arrangement.

FIG. 3 shows an example of signals, which can occur in the bus arrangement 10 according to FIG. 2. FIG. 3 shows the electrical signal S1, phases in the media converter 12, the internal control signal SI1, the optical signal SO, phases in the further media converter 17, the further electrical signal S2 and the control input signal SI2 as a function of a time t. The coordinator 13 emits the electrical signal S1 to the first electrical bus 14. The electrical signal S1 first has regular clock pulses, which are used to synchronize the media converter 12 with the electrical signal S1 during a synchronization phase PS1.

After the regular clock pulses, the electrical signal S1 has pulses, which contain data. A data transfer phase PB1 thus follows the synchronization phase PS1. The data are transferred in bytes. At the end of the data transfer phase PB1, the electrical signal 1 has a first value W1 during a first time period T1 and then a second value W2 during a second time period T2. Alternatively, the phase with the first time period T1 can also be omitted. An idle phase or inactivity phase ("idle time") can have the second time period T2. After the end of the idle phase with the second time period T2, the data transfer phase PB1 in the media converter 12 is completed. The synchronization phase PS1 and the data transfer phase PB1 form a transmission phase.

The first value W1 can also be referred to as the first logical value. The second value W2 can also be referred to as the second logical value. The first value W1 can be 0 and the second value W2 can be 1, as shown in FIG. 3. Alternatively, the first value W1 can be 1 and the second value W2 can be 0. The first value W1 can be 0 for some of the signals S1, SO, ST, SI1, SI2 and 1 for other of the signals S1, SO, ST, SI1, SI2.

The data transfer phase PB1 is followed by a rest phase PI of the media converter 12. The rest phase PI lasts for a third time period T3. The sum of the second time period T2 and the third time period T3 results in the period T4 of a gap between the frames ("inter-frame gap").

The rest phase PI of the media converter 12 is terminated by pulses of the electrical signal S1. The regular pulses of the electrical signal S1 in turn serve to synchronize the media converter 12 with the electrical signal S1, so that the media converter 12 is in a further synchronization phase PS2. The further synchronization phase PS2 is followed by a further data transfer phase PB2. The further synchronization phase PS2 and the further data transfer phase PB2 form a further transmission phase. The electrical signal S1 in the further synchronization phase PS2 is identical to the electrical signal S1 in the synchronization phase PS1. At the beginning of the synchronization phases PS1, PS2, the electrical signal S1 changes from the second value W2 to the first value W1.

According to FIG. 3, the media converter 12 generates the internal control signal SI1 during the data transfer phase PB1. The internal control signal ST is emitted by the control unit 39 of the media converter 12. That is to say, during the data transfer phase PB1, the internal control signal SI1 has a transition from the first value W1 to the second value W2. The internal control signal SI1 remains at the second value W2 even during the following rest phase PI. The media converter 12 can be implemented or set as passive, for example. In this case, the control unit 39 generates the internal control signal SI1 from the control signal ST present at the control terminal 33 of the media converter.

Alternatively, the media converter 12 takes the command from the electrical signal S1 during the data transfer phase PB1 to generate the internal control signal SI1. The media converter 12 can, for example, be implemented or set as active.

The internal control signal SI1 can be a signal present internally in the media converter 12 in both cases. The internal control signal SI1 can be a flag or a marker.

The description of FIG. 3 can be exemplary for the case that the internal control signal SI1 is generated from the control signal ST supplied by the first station 11, and for the case that the internal control signal SI1 is generated on the basis of a command taken from the electrical signal S1 by the media converter 12.

The media converter 12 generates the optical signal SO on the basis of the electrical signal S1. During the synchronization phase PS1 and the data transfer phase PB1, the optical signal SO corresponds to the electrical signal S1. This means that the optical signal SO transmits the same information as the electrical signal S1. In the embodiment shown here, the optical signal SO starts at the beginning of the synchronization phase PS1 from a second value W2 and changes from the second value W2 to a first value W1. In the data transfer phase PB1, the optical signal SO has the first value W1 for the optional first time period T1 and the second value W2 for the second time period T2. The transitions from the optical signal SO are shifted in time with respect to the electrical signal S1 (for example by one pulse or by half of a clock phase, or by an integral multiple thereof).

Because the internal control signal SD changes from the first value W1 to the second value W2 during the data transfer phase PB1, at the end of the data transfer phase PB1, namely at the end of the idle phase with the second time period T2, denoted as t1 in FIG. 3, the media converter 12 emits the optical signal SO with the first value W1. That is, at the first instant t1, the optical signal SO changes from the second value W2 to the first value W1. Thus, in the rest phase PI, the optical signal SO is inverted with respect to the electrical signal S1. The transition in the internal control signal SD thus triggers a transition in the optical signal SO at the end of the data transfer phase PB1, namely here in the example from the second value W2 to the first value W1. If there is no transition in the internal control signal SI1, the optical signal SO remains constant at the end of the data transfer phase PB1 and in the subsequent rest phase PI. The SO signal remains inverted until the next change in the internal control signal SI1.

During the further synchronization phase PS2 in FIG. 3, the optical signal SO starts from the first value W1 and changes to the second value W2 in contrast to the electrical signal S1 in the further synchronization phase PS2 and in contrast to the optical signal SO in the synchronization phase PS1. The optical signal SO is thus inverted during the further synchronization phase PS2 with respect to the optical signal SO during the synchronization phase PS1. During the further synchronization phase PS2 and the following further data transfer phase PB2, the optical signal SO is inverted with respect to the electrical signal S1.

The further media converter 17 emits the further electrical signal S2. During the synchronization phase PS1 of the further media converter 17, the further electrical signal S2 is identical to the electrical signal S1, apart from a time delay (which includes, for example, two pulses or a clock phase). The further electrical signal S2 also starts from the second value W2 and changes to the first value W1 at the beginning of the synchronization phase PS1. At the end of the data transfer phase PB1, the further electrical signal S2 first has the first value W1 for the optional first time period T1 and then the second value W2 for the second time period T2. The further electrical signal S2 does not change its value at the end of the data transfer phase PB1. In contrast to the optical signal SO, the further electrical signal S2 remains constant at the second value W2 at the end of the data transfer phase PB1 and the following rest phase PI.

After the transition in the optical signal SO at the end of the data transfer phase PB1 from the second value W2 to the first value W1, the further media converter 17 is in an intermediate phase PU for a fifth time period T5. The fifth time period T5 can be of the same length as the second time period T2, but also longer or shorter than the second time period T2. The intermediate phase PU can be a further idle phase. The fifth time period T5, like the second time period T2, can have a predetermined value. The rest phase PI also includes the intermediate phase PU.

The further media converter 17 detects from the pulse shape in the optical signal SO that the internal control signal SI1 has the second value W2. The optical signal SO, namely at the end of the data transfer phase PB1, has the first value W1, then the second value W2 for the second time period T2 and then the first value W1 for the fifth time period T5. The optical signal SO thus has a pulse from the values 010. After the end of the fifth time period T5 at a second instant t2, the further media converter 17 sets a pulse in the control input signal SI2. If, on the other hand, the optical signal SO were to contain short pulses after the end of the data transfer phase PB1, the further media converter would detect this as the beginning of the further synchronization phase PS2 and would not change the control input signal SI2. At the second instant t2, the control input signal SI2 has a transition from the first value W1 to the second value W2. The further media converter 17 has thus detected that the media converter 12 has set the pulse in the internal control signal SI1 in the preceding data transfer phase PB1. The optical signal SO in the further transmission phase is thus based on the internal control signal SI1 generated in the transmission phase and of the electrical signal S1 in the further transmission phase.

In a preliminary phase PI*, the bus arrangement 10, for example, can be idle. After the preliminary phase PI *, the further media converter 17 emits the further electrical signal S2 in such a way that it has a transition from the second value W2 to the first value W1. The further media converter 17 thus generates the further electrical signal S2 by inverting the optical signal SO. The further electrical signal S2 thus corresponds to the electrical signal S1 in the further synchronization phase PS2 and the subsequent further data transfer phase PB2. Advantageously, by transferring the internal control signal SI1 to generate the control input signal SI2, no change in the signal shape in the further electrical signal S2 is generated compared to the signal shape in the electrical signal S1, with the exception of a time shift. The control signal ST, the internal control signal SI1 and the control input signal SI2 are single-bit signals.

The further media converter 17 can emit the control input signal SI2 as a further control signal ST3 to the further station 18 and thereby activate it. The further station 18 activated in this way can then take its address from the further electrical signal S2. In this case, the further media converter 17 can be implemented or set as a passive media converter.

Alternatively, the further media converter 17 can be activated by the control input signal SI2. The further media converter 17 activated in this way can take its address from the optical signal SO. In this case, the further media converter 17 can be implemented or set as an active media converter.

When data is transferred via the optical medium, the pause between two data telegrams is used to invert the polarity of the data. This inversion is detected by the further media converter 17 and evaluated as a single-bit signal SI2. The further media converter 17 has the function of a receiver. It can also take over the function of a transmitter and transfer data, for example from the further station 18, to the coordinator 13. The need for a further control line (the optical control line 50) in addition to the optical transmission path for the useful data is advantageously avoided.

If the internal control signal SI1 remains at the first value W1 in the data transfer phase PB1, the media converter 12 does not invert the optical signal SO with respect to the electrical signal S1. In this case, the control input signal SI2 remains at the first value W1 and the further media converter 17 generates the further electrical signal S2 from the optical signal SO without inversion.

In an alternative embodiment, the bus arrangement 10 does not include a first station 11. The coordinator 13 is connected directly to the first electrical control terminal 33 of the media converter 12 via the control line 29. In this case, the coordinator 13 emits the control signal ST directly and immediately to the first electrical control terminal 33 of the media converter 12.

In an alternative embodiment, further stations are arranged between the coordinator 13 and the first station 11 on the first electrical bus 14.

In an alternative embodiment, at least one additive station is arranged on the first electrical bus 14, which is arranged downstream of the media converter 12. The additive station or stations are arranged between the media converter 12 and the further terminating arrangement 27. For this purpose, the media converter 12 has a second electrical control terminal, which is connected directly via a control line to a first electrical control terminal of the next additive station. The media converter 12 is thus implemented as a splitter, tap or distributor. To activate the next additive station, for example, the coordinator 13 can use the electrical signal S1 to transmit a command to the media converter 12 to emit a control signal to the first electrical control terminal of the next additive station via the second electrical control terminal of the media converter 12. Alternatively, the coordinator 13 gives a command to the media converter 12 via the electrical signal S1 to transmit the internal control signal SI1 via the optical bus 15 as described above.

The media converter 12 can also be switched to be passive, wherein the setting to forward the internal control signal via the optical bus 15 or the second electrical control terminal is stored permanently and/or in a non-volatile way.

The media converter 12 can, for example, be set as an active media converter in an initial configuration phase and then be set as a passive media converter. The passive media converter 12 can be free of any address assigned by the coordinator 13; the active media converter 12 has an address assigned by the coordinator 13.

In an alternative embodiment, additional stations are connected to the second electrical bus 16.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGN LIST

10 bus arrangement
11 first station
12 media converter
13 coordinator
14 first electrical bus
15 optical bus
16 second electrical bus
17 further media converter
18 further station
21 first electrical bus line
22 second electrical bus line
23 terminating arrangement
24 to 26 resistance
27 further terminating arrangement
28 first control line
29 control line
30 electrical bus port
31 first line
32 second line
33 first electrical control terminal
34 optical bus port
35 first optical line
36 second optical line
37 first optical terminal
38 second optical terminal
39 control unit
40 optical bus port
41 electrical bus port
42, 43 terminating arrangement
44 third electrical bus line
45 fourth electrical bus line
46 electrical bus port
47 further control line
48 control unit
50 optical control line
PB1, PB2 data transfer phase
PI rest phase
PI* preliminary phase
PS1, PS2 synchronization phase
PU undefined state
SI1 internal control signal
SI2 control input signal
SO, SO2 optical signal
ST, ST1, ST3 control signal
STO optical control signal
S1 electrical signal
S2 further electrical signal
t time
t0, t1, t2 instant
T1 to T5 time period
W1 first value
W2 second value

The invention claimed is:

1. A media converter, the media converter comprising:

an electrical bus port for connecting a first electrical bus; and an optical bus port for connecting an optical bus, wherein the media converter is configured to convert an electrical signal of the first electrical bus into an optical signal of the optical bus in such a way that, at a first value of an internal control signal of the media converter, the optical signal corresponds to the electrical signal and, at a second value of the internal control signal, the optical signal has an inverted shape corresponding to the electrical signal, and wherein, in a transmission phase during which the internal control signal changes from the first value to the second value, the media converter is configured to emit the optical signal in such a way that the optical signal corresponds to the electrical signal until the end of the transmission phase.

2. The media converter according to claim 1, wherein the media converter is configured, after a change of the internal control signal from the first value to the second value, to change a value of the optical signal in a rest phase, and in a further transmission phase following the rest phase to output the optical signal in inverted form with respect to the electrical signal.

3. The media converter according to claim 1, wherein the electrical bus port of the media converter comprises two electrical lines which are connected to two electrical bus lines of the first electrical bus.

4. The media converter according to claim 1, wherein the optical bus port of the media converter comprises two optical terminals which are connected to two optical lines of the optical bus.

5. The media converter according to claim 1, wherein the media converter comprises a first electrical control terminal, and wherein the media converter is configured to tap a control signal at the first electrical control terminal and to generate the internal control signal from the control signal or to generate the internal control signal on the basis of the electrical signal of the first electrical bus.

6. A bus arrangement, the bus arrangement comprising:

the media converter according to claim 1;

the optical bus; and a further media converter, wherein the further media converter comprises an electrical bus port configured to connect a second electrical bus, and an optical bus port configured to connect the optical bus, and wherein the further media converter is configured to convert the optical signal of the optical bus into a further electrical signal of the second electrical bus.

7. The bus arrangement according to claim 6, wherein the further media converter is configured:

to detect whether it receives the optical signal in inverted form, and to change the value of a control input signal from a first value to a second value in the event that the further media converter has detected that it is receiving the optical signal in inverted form.

8. The bus arrangement according to claim 6, wherein the further media converter is configured to:

to detect whether it receives the optical signal in inverted form, and to output the further electrical signal to the second electrical bus in such a way that the further electrical signal is inverted with respect to the optical signal in the event that the further media converter has detected that it is receiving the optical signal in inverted form.

9. The bus arrangement according to claim 6, wherein the media converter, the further media converter and the optical bus are configured for bidirectional optical data transmission.

10. The bus arrangement according to claim 6, comprising a coordinator which is coupled to the electrical bus port of the media converter via the first electrical bus.

11. The bus arrangement according to claim 10, comprising a first station which is coupled to the coordinator via the first electrical bus and comprises a second electrical control terminal which is directly connected to the first electrical control terminal of the media converter.

12. The bus arrangement according to claim 6, comprising a further station which is coupled to the further media converter via the second electrical bus.

13. A method for operating a media converter, the method comprising:

the media converter generating an internal control signal, the media converter receiving an electrical signal from a first electrical bus and the media converter emitting an optical signal to an optical bus, wherein the media converter emits the optical signal in such a way that, at a first value of the internal control signal, the optical signal corresponds to the electrical signal, and, at a second value of the internal control signal, the optical signal has an inverted shape corresponding to the electrical signal, wherein, in a transmission phase during which the internal control signal changes from the first value to the second value, the media converter emits the optical signal in such a way that the optical signal corresponds to the electrical signal until the end of the transmission phase.

* * * * *